(12) United States Patent
Kuo et al.

(10) Patent No.: US 8,605,333 B2
(45) Date of Patent: Dec. 10, 2013

(54) DEPOSITING TEXTURE ON RECEIVER

(75) Inventors: Chung-Hui Kuo, Fairport, NY (US);
Hwai-Tzuu Tai, Rochester, NY (US);
John T Hartman, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 302 days.

(21) Appl. No.: 13/114,097

(22) Filed: May 24, 2011

(65) Prior Publication Data

US 2012/0300229 A1    Nov. 29, 2012

(51) Int. Cl.
*H04N 1/40* (2006.01)

(52) U.S. Cl.
USPC .............................. 358/3.24; 358/2.1; 382/108

(58) Field of Classification Search
USPC ............... 358/2.1, 1.9, 3.16–3.17, 3.24–3.26, 358/500–504, 518–519; 382/108
See application file for complete search history.

(56) References Cited

U.S. PATENT DOCUMENTS

| | | | |
|---|---|---|---|
| 5,984,446 A | 11/1999 | Silverbrook | |
| 6,002,847 A | 12/1999 | Silverbrook | |
| 6,608,641 B1 | 8/2003 | Alexandrovich et al. | |
| 6,967,753 B2 | 11/2005 | Schramm | |
| 7,212,772 B2 | 5/2007 | Kasiske et al. | |
| 7,324,115 B2 * | 1/2008 | Fraser | 345/553 |
| 7,468,820 B2 | 12/2008 | Ng | |
| 7,821,659 B2 | 10/2010 | Kodama et al. | |
| 2006/0133870 A1 | 6/2006 | Ng | |
| 2008/0159786 A1 | 7/2008 | Tombs et al. | |

FOREIGN PATENT DOCUMENTS

| | | |
|---|---|---|
| GB | 2 284 319 | 5/1995 |
| WO | 90/07753 | 7/1990 |

* cited by examiner

*Primary Examiner* — Thomas D Lee
*Assistant Examiner* — Stephen M Brinich
(74) *Attorney, Agent, or Firm* — Christopher J. White; Kevin E. Spaulding

(57) ABSTRACT

Apparatus for depositing a texture on a receiver includes a data source that provides multilevel input tint data values. A lossy compressor produces compressed multilevel tint data values from the multilevel input tint data values. A decompressor produces multilevel decompressed tint data values from the compressed multilevel tint data values. A texture memory receives those values from the decompressor and provides corresponding multilevel texture pixel data values. A print engine deposits at each of a plurality of pixel sites on the receiver an amount of texture-forming material corresponding to the respective multilevel texture pixel data value. A loader loads into the texture memory a texture set including multilevel texture pixel data values for each of a plurality of textures, and each texture in the texture set corresponds to a respective selected range of multilevel decompressed tint data value.

9 Claims, 4 Drawing Sheets

DEPOSITING TEXTURE ON RECEIVER

FIELD OF THE INVENTION

This invention pertains to the field of printing and more particularly to improving image quality of various types of printed images.

BACKGROUND OF THE INVENTION

Electrophotographic printers produce images by depositing toner on receivers (or "imaging substrates"), such as pieces or sheets of paper or other planar media, glass, fabric, metal, or other objects. Printers typically operate using subtractive color: a substantially reflective receiver is overcoated image-wise with cyan (C), magenta (M), yellow (Y), black (K), and other colorants. Other toner compositions can be used to produce effects beyond simple image appearance.

For example, U.S. Publication No. 20080159786 by Tombs et al., entitled "Selective printing of raised information by electrography," published Jul. 3, 2008, the disclosure of which is incorporated herein by reference, describes electrophotographic printing using marking particles of a substantially larger size than the standard size marking particles of the desired print image. These particles are referred to herein as "dimensional" particles. Tombs et al. also describe using non-pigmented ("clear") marking particles to overlay raised information on an image. This technique is very useful. For example, clear dimensional ("DMCL") particles can be used to produce tactile effects, such as textures a viewer feels when he touches an image printed on a receiver.

WO 90/07753 by Small et al. and GB 2 284 319 by Tompkins et al. describe a job image buffer (JIB) that stores compressed image data in memory until it is to be printed.

U.S. Pat. No. 5,984,446 to Silverbrook describes a drop-on-demand inkjet printer with a band-by-band page image compression system, and U.S. Pat. No. 6,002,847, also to Silverbrook, provides more detail of a compressed-image storage apparatus useful with that printer. The '847 reference describes JPEG compression of pixel data. This reference also points out that JPEG compression of high-frequency patterns can add noise to the image.

SUMMARY OF THE INVENTION

Modem electrophotographic printers have resolutions of at least 600 dpi in the horizontal and vertical directions. As a result, a full letter-size page requires 256 MiB of storage per channel, or 1284 MiB for a five-channel (CMYK+DMCL) image. Consequently, image compression is used to permit the printer to transmit image data in a short enough time to meet the productivity requirements of the printer. However, texture data often contains high-frequency data that is corrupted by compression. Moreover, even if compression restores the texture data, it can introduce block boundaries (e.g., every 8×8 or 16×16 pixels) that interrupt the viewer's perception of the texture.

There is therefore a continuing need for producing high-fidelity textures on a receiver without introducing compression artifacts.

According to an aspect of the present invention, there is provided apparatus for depositing a texture on a receiver, comprising:

a) a data source that provides multilevel input tint data values;

b) a lossy compressor that produces compressed multilevel tint data values from the multilevel input tint data values;

c) a decompressor that produces multilevel decompressed tint data values from the compressed multilevel tint data values;

d) a texture memory adapted to receive multilevel decompressed tint data values from the decompressor and provide corresponding multilevel texture pixel data values;

e) a loader for loading into the texture memory a texture set including multilevel texture pixel data values for each of a plurality of textures, each texture in the texture set corresponding to a respective selected range of multilevel decompressed tint data values; and f) a print engine that deposits at each of a plurality of pixel sites on the receiver an amount of texture-forming material corresponding to the respective multilevel texture pixel data value.

An advantage of this invention is that it provides high-fidelity textures without increasing the bandwidth requirements of image transmission. Various embodiments use blocks of input tint values for a given texture to provide robustness against differences between the multilevel input tint data values and the multilevel decompressed tint data values. Various embodiments provide user-specified textures and high-fidelity predetermined textures. Various embodiments provide textures that tie a print to an identifiable person, printer, or company in a secure way, permitting authentication of prints.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
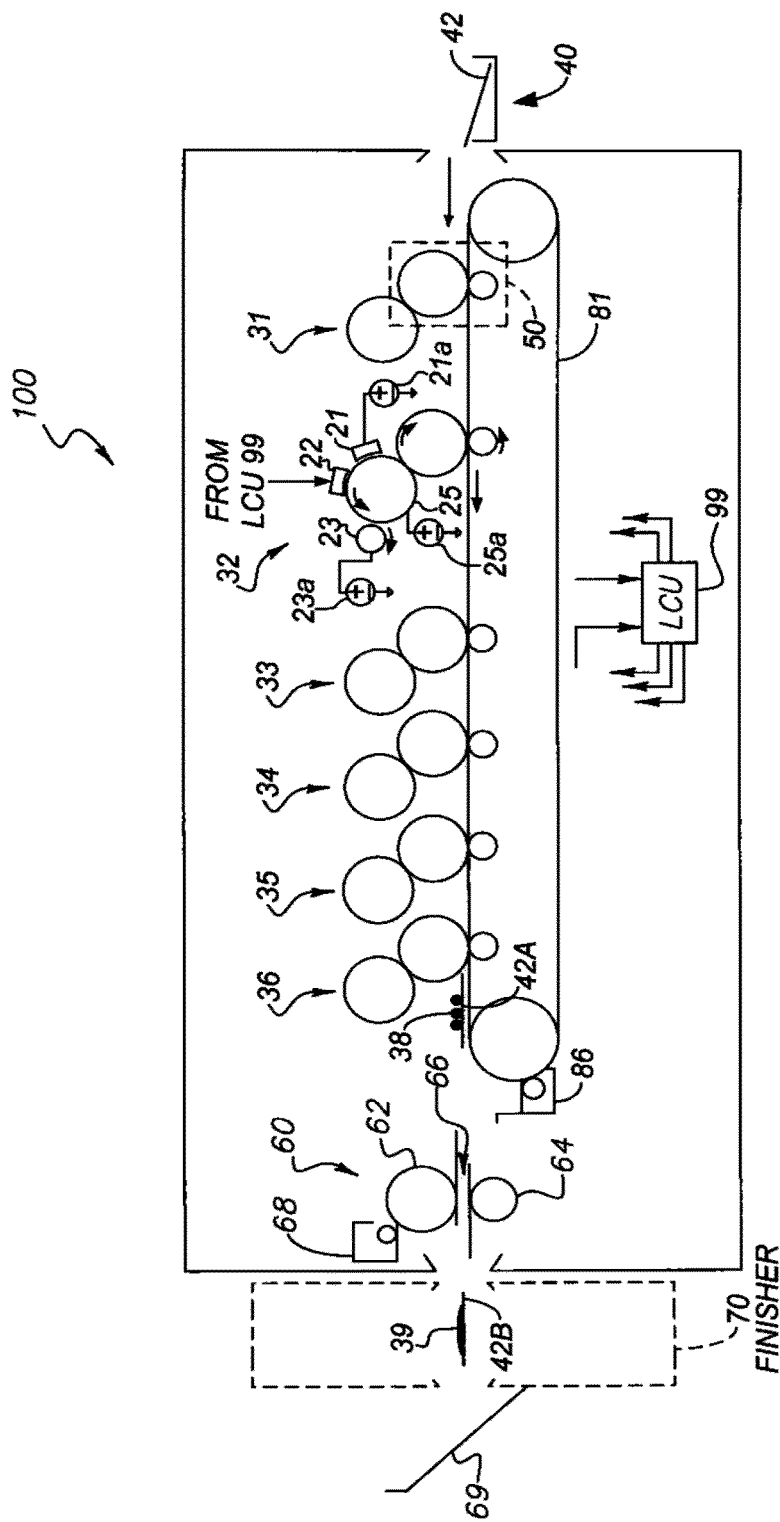
FIG. 1 is an elevational cross-section of an electrophotographic reproduction apparatus suitable for use with various embodiments.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, embodiments described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of the invention is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice various embodiments.

The electrophotographic (EP) printing process can be embodied in devices including printers, copiers, scanners, and facsimiles, and analog or digital devices, all of which are referred to herein as "printers." Various embodiments are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine useful with various embodiments, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

FIG. 1 is an elevational cross-section showing portions of a typical electrophotographic printer 100 useful with various embodiments. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. One embodiment involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module 31, 32, 33, 34, 35, 36 produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver 42, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image. Toner particles can have a range of diameters, e.g., less than 8 μm, on the order of 10-15 μm, up to approximately 30 μm, or larger ("diameter" refers to the volume-weighted median diameter, as determined by a device such as a Coulter Multisizer).

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired print image 38 on the receiver, as shown on receiver 42A. The imaging process is typically repeated many times with reusable photoreceptors 25.

Receiver 42A is then removed from its operative association with photoreceptor 25 and subjected to heat or pressure to permanently fix ("fuse") print image 38 to receiver 42A. Plural print images, e.g. of separations of different colors, are overlaid on one receiver before fusing to form a multi-color print image 38 on receiver 42A.

Each receiver 42, during a single pass through the six printing modules 31, 32, 33, 34, 35, 36, can have transferred in registration thereto up to six single-color toner images to form a pentachrome image. As used herein, the term "hexachrome" implies that in a print image, combinations of various of the six colors are combined to form other colors on receiver 42 at various locations on receiver 42. That is, each of the six colors of toner can be combined with toner of one or more of the other colors at a particular location on receiver 42 to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms print image 38 using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images 38, overlaid in registration, one from each of the respective printing modules 31, 32, 33, 34, 35, 36, receiver 42A is advanced to a fuser 60, i.e. a fusing or fixing assembly, to fuse print image 38 to receiver 42A. Transport web 81 transports the print-image-carrying receivers (e.g., 42A) to fuser 60, which fixes the toner particles to the respective receivers 42A by the application of heat and pressure. The receivers 42A are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed. For example, solvent fixing uses solvents to soften the toner particles so they bond with the receiver 42. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver 42.

The receivers (e.g., receiver 42B) carrying the fused image (e.g., fused image 39) are transported in a series from the fuser 60 along a path either to a remote output tray 69, or back to printing modules 31, 32, 33, 34, 35, 36 to create an image on the backside of the receiver (e.g., receiver 42B), i.e. to form a duplex print. Receivers (e.g., receiver 42B) can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g. printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. These parameters can be changed, as described below.

Further details regarding printer 100 are provided in U.S. Pat. No. 6,608,641, issued on Aug. 19, 2003, to Peter S. Alexandrovich et al., and in U.S. Publication No. 20060133870, published on Jun. 22, 2006, by Yee S. Ng et al., the disclosures of which are incorporated herein by reference.

Figure 2:
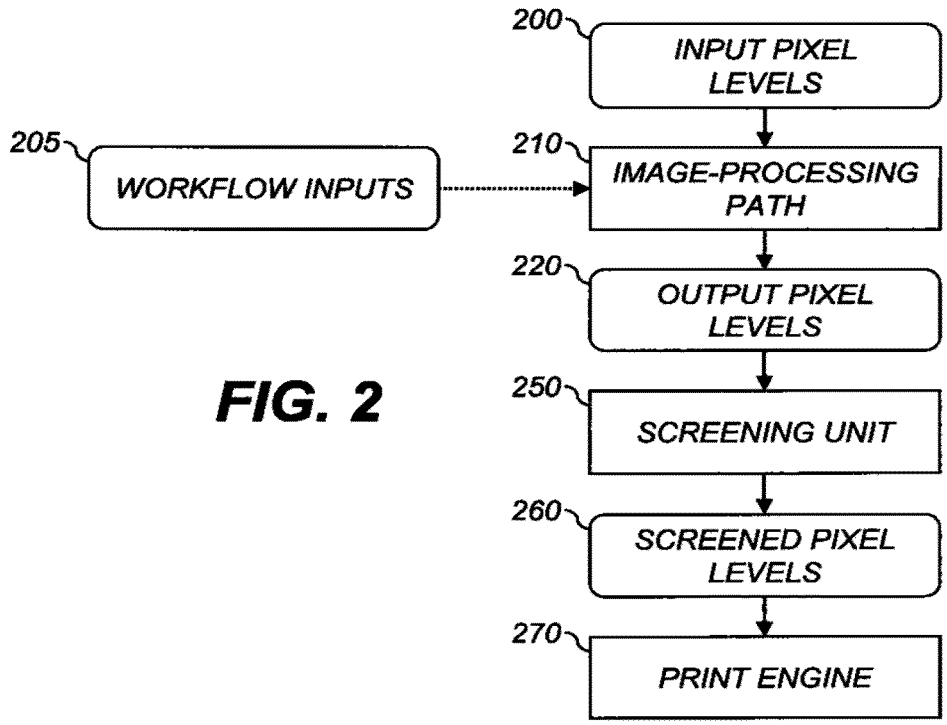
FIG. 2 shows a data-processing path useful with various embodiments.

FIG. 2 shows a data-processing path useful with various embodiments, and defines several terms used herein. Printer 100 (FIG. 1) or corresponding electronics (e.g. the DFE or RIP), described herein, operate this datapath to produce image data corresponding to exposure to be applied to a photoreceptor, as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 200. These can be any level known in the art, e.g. sRGB code values (0 . . . 255) for red, green, and blue (R, G, B) color channels. There is one pixel level for each color channel. Input pixel levels 200 can be in an additive or subtractive space. Image-processing path 210 converts input pixel levels 200 to output pixel levels 220, which can be cyan, magenta, yellow (CMY); cyan, magenta, yellow, black (CMYK); or values in another subtractive color space. This conversion can be part of the color-management system discussed above. Output pixel level 220 can be linear or non-linear with respect to exposure, L*, or other factors known in the art. Image-processing path 210 transforms input pixel levels 200 of input color channels (e.g. R) in an input color space (e.g. sRGB) to output pixel levels 220 of output color channels (e.g. C) in an output color space (e.g. CMYK). In various embodiments, image-processing path 210 transforms input pixel levels 200 to desired CIELAB (CIE 1976 L*a*b*; CIE Pub. 15:2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 210 can use optional workflow inputs 205, e.g. ICC profiles of the image and the printer 100, to calculate the output pixel levels 220. RGB can be converted to CMYK according to the Specifications for Web Offset Publications (SWOP; ANSI CGATS TR001 and CGATS.6), Euroscale (ISO 2846-1:2006 and ISO 12647), or other CMYK standards.

Input pixels are associated with an input resolution in pixels per inch (ippi, input pixels per inch), and output pixels with an output resolution (oppi). Image-processing path 210 scales or crops the image, e.g. using bicubic interpolation, to change resolutions when ippi oppi. The following steps in the path (output pixel levels 220, screened pixel levels 260) are preferably also performed at oppi, but each can be a different resolution, with suitable scaling or cropping operations between them.

Screening unit 250 calculates screened pixel levels 260 from output pixel levels 220. Screening unit 250 can perform continuous-tone (processing), halftone, multitone, or multi-level halftone processing, and can include a screening memory or dither bitmaps. Screened pixel levels 260 are at the bit depth required by print engine 270.

Print engine 270 represents the subsystems in printer 100 that apply an amount of toner corresponding to the screened pixel levels to a receiver 42 (FIG. 1) at the respective screened pixel locations. Examples of these subsystems are described above with reference to FIG. 1. The screened pixel levels and locations can be the engine pixel levels and locations, or additional processing can be performed to transform the screened pixel levels and locations into the engine pixel levels and locations.

Figure 3:
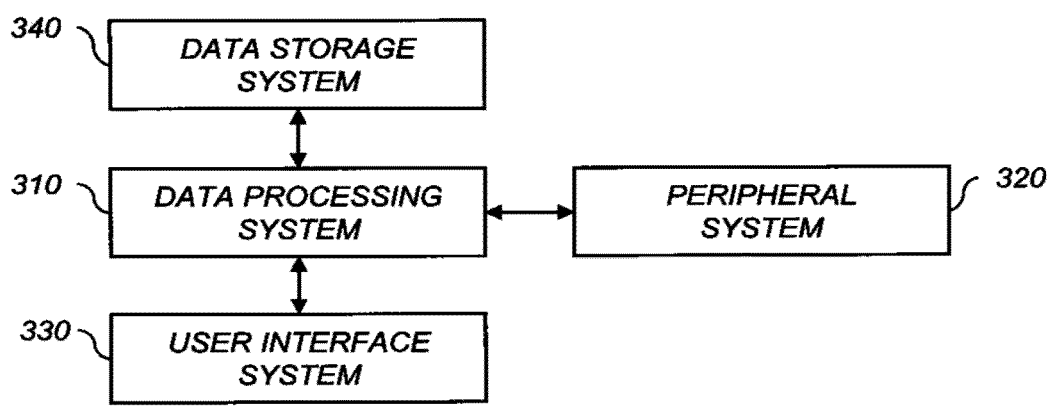
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of the various embodiments, including the example processes described herein. Data storage system 340 can be a distributed processor-accessible memory system including multiple processor-accessible memories communicatively connected to data processing system 310 via a plurality of computers or devices. On the other hand, data storage system 340 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 340 is shown separately from data processing system 310, one skilled in the art will appreciate that data storage system 340 can be stored completely or partially within data processing system 310. Further in this regard, although peripheral system 320 and user interface system 330 are shown separately from data processing system 310, one skilled in the art will appreciate that one or both of such systems can be stored completely or partially within data processing system 310.

Peripheral system 320 can include one or more devices configured to provide digital content records to data processing system 310. For example, peripheral system 320 can include digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. In this regard, although peripheral system 320 is shown separately from user interface system 330, peripheral system 320 can be included as part of user interface system 330.

User interface system 330 also can include a display device, a processor-accessible memory, or any device or combination of devices to which data is output by data processing system 310. In this regard, if user interface system 330 includes a processor-accessible memory, such memory can be part of data storage system 340 even though user interface system 330 and data storage system 340 are shown separately in FIG. 1.

Figure 4:
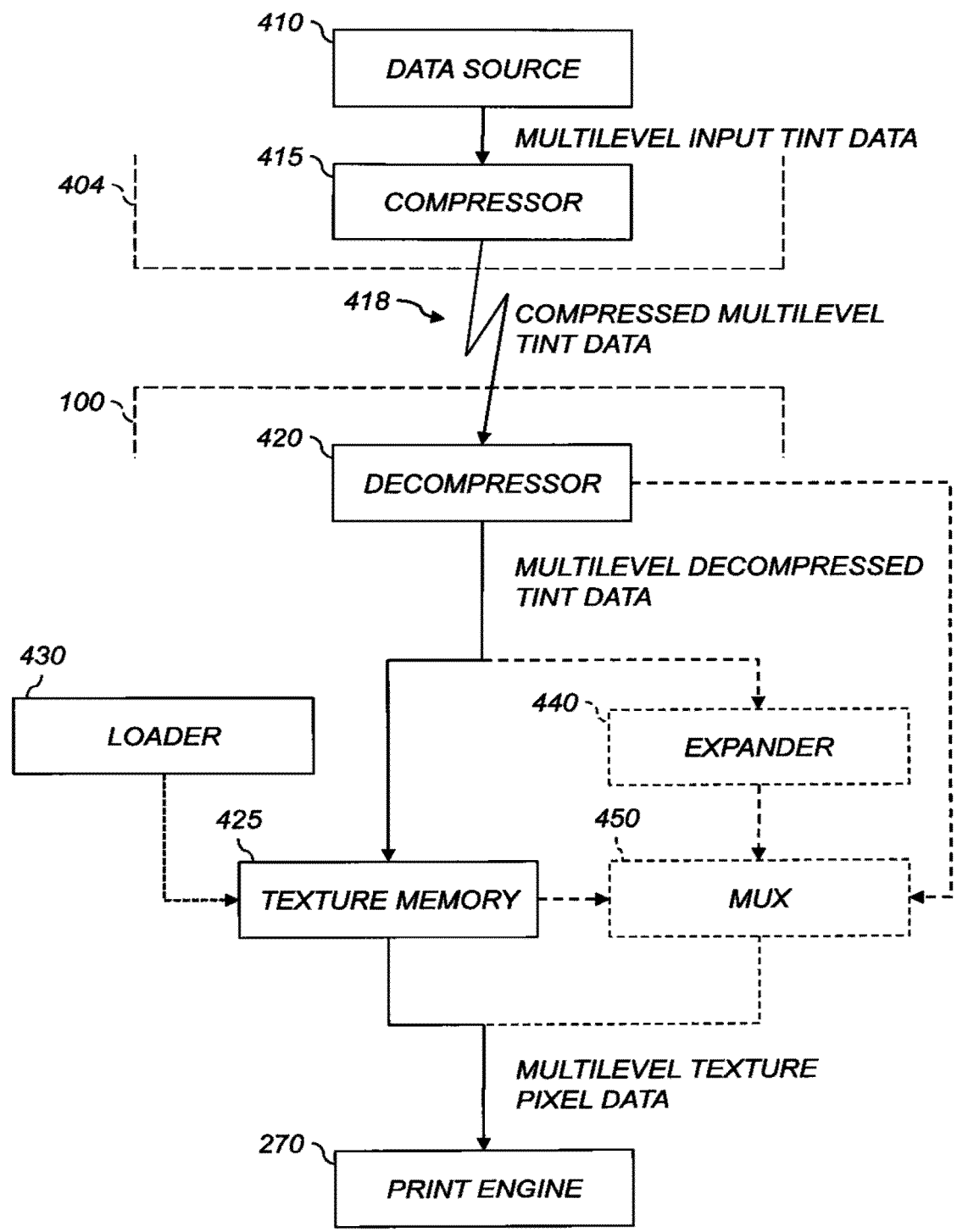
FIG. 4 is a block diagram of apparatus for depositing a texture on a receiver according to various embodiments.

FIG. 4 is a block diagram of apparatus for depositing a texture on a receiver according to various embodiments.

Data source 410 provides multilevel input tint data values to compressor 415.

Compressor 415 is a lossy compressor that produces compressed multilevel tint data values from the multilevel input tint data values. The compressed values are provided to decompressor 420. In various embodiments, compressed data values are transmitted over data link 418. In the example shown, RIP 404 includes the parts through compressor 415, and printer 100 includes decompressor 420 on.

Decompressor 420 produces multilevel decompressed tint data values from the compressed multilevel tint data values. The decompressed data are provided to texture memory 425.

Loader 430 loads into texture memory 425 a texture set including multilevel texture pixel data values for each of a plurality of textures. Each texture in the texture set corresponds to a respective selected range of multilevel decompressed tint data values. In an embodiment, the mapping from eight-bit multilevel input tint data values to textures is as given in Table 1.

TABLE 1

| Tint Selection | Texture Name | Max Code Value | Min Code Value |
|---|---|---|---|
| 100% | texture__10 | 255 | 243 |
| 90% | texture__9 | 242 | 217 |
| 80% | texture__8 | 216 | 192 |
| 70% | texture__7 | 191 | 166 |
| 60% | texture__6 | 165 | 141 |
| 50% | texture__5 | 140 | 115 |
| 40% | texture__4 | 114 | 90 |
| 30% | texture__3 | 89 | 64 |
| 20% | texture__2 | 63 | 39 |
| 10% | texture__1 | 38 | 13 |
| 0% | No Texture | 12 | 0 |

In Table 1, "tint selection" is the value the creator of an image specifies in an image-manipulation program to pick the texture in the "texture name" column. Different programs map tints in percent to eight-bit values differently. Therefore, for each tint in percentage as entered by the user, the eight-bit code values from "min code value" to "max code value" map to the named texture.

Texture memory 425 receives multilevel decompressed tint data values from decompressor 420. Texture memory 425 provides a corresponding multilevel texture pixel data value for each multilevel decompressed tint data value, using the texture set loaded by loader 430. In various embodiments, texture memory 425 includes a 3-D LUT having 256 bit planes (or the number of multilevel decompressed tint data values, if not 256). Each plane has a number of rows and columns equal to the size of a texture tile, e.g., 32×32 or 64×64 pixels. The LUT is indexed with the multilevel decompressed tint data value and the row and column of the corresponding pixel, modulo the texture size. The multilevel texture pixel data value retrieved from the LUT is eight bits (or the number of bits in multilevel texture pixel data values, if not eight).

Print engine 270 deposits at each of a plurality of pixel sites on the receiver 42 (FIG. 1) an amount of texture-forming material corresponding to the respective multilevel texture pixel data value from texture memory 425. The texture-forming material can be a toner or can include toner particles.

The embodiments described above permit textures loaded by loader 430 to be selecting using multilevel input tint data values from data source 410. In other embodiments, described below, some or all of the multilevel input tint data value range is reserved for user-defined textures.

In these embodiments, expander 440 provides multilevel texture pixel data values in a selected wide range from multilevel decompressed tint data values in a selected narrow range. In an example, Table 1 (above) is modified so that instead of texture__2 and texture__3, the domain [39,89] is used by expander 440:

pixel data=(decompressed tint data−39)×5.

Therefore the 51 values on [39,89] map to 0, 5, 10, . . . , 250, respectively. In this example, texture pixel data values [251, 255] are not produced by expander 440. In other examples, all 256 pixel data values are in the range of expander 440. The domain and range of expander 440 are selected according to the number of bits in tint data and pixel data values, and the desired level of user control. The more of the tint data value range is reserved for user-defined textures, the less is available for predefined, high-fidelity textures, and vice versa. In various embodiments, several contiguous tint data values are mapped to the same pixel data value. This provides robustness against changes between the multilevel input tint data values specified by the user and the multilevel decompressed tint data values received by expander 440. For example, the domain [39,89] can be mapped by the expander to the range 0, 0, 10, 10, 20, 20, . . . , 240, 240, 250, respectively:

pixel data=⌊(decompressed tint data−39)/2⌋×10.

Multiplexer (mux) 450 receives the multilevel decompressed tint data values from decompressor 420. For each received value, if the value is in the narrow range, mux 450 provides the corresponding multilevel texture pixel data value from expander 440 to print engine 270. Otherwise, mux 450 provides the corresponding multilevel texture pixel data value from texture memory 425 to print engine 270. This provides user selection of textures uncorrupted by compression artifacts using tint data values outside the narrow range, and provides arbitrary user-defined textures (albeit subject to compression error) inside the narrow range.

In various embodiments, loader 430 receives an authentication key, checks the authentication key for validity, and loads the texture set into texture memory 425 if and only if the authentication key is valid. In an example, loader 430 stores, in a manner resistant to tampering, the cryptographic public key of a trusted texture provider. The provider signs the texture set by encrypting a hash of the texture set data with its private key. The encrypted hash is the authentication key. Loader 430 decrypts the authentication key using the stored public key, hashes the corresponding texture set, and determines that the authentication key is valid if the decrypted hash matches its calculated hash. Various digital signature algorithms can be used, including RSASSA-PSS defined in PKCS #1 v2.1, RFC 3447, sec. 8. Other signature schemes are defined in IEEE Std. 1363-2000, and in FIPS 186-3 (2009) (the NIST Digital Signature Algorithm). In various embodiments, loader 430 stores the public keys of one or more trusted root certification authorities (CAs) in a public-key infrastructure, and accepts authentication keys from any provider with a chain of trust through zero or more intervening CAs to one of the trusted root CAs. In various embodiments, loader 430 also stores, in a manner resistant to tampering, or receives from other components of the printer a unique ID (e.g., a 128-bit GUID) uniquely identifying the particular printer, print shop, operator, or other party or hardware involved in producing the print.

Figure 5:
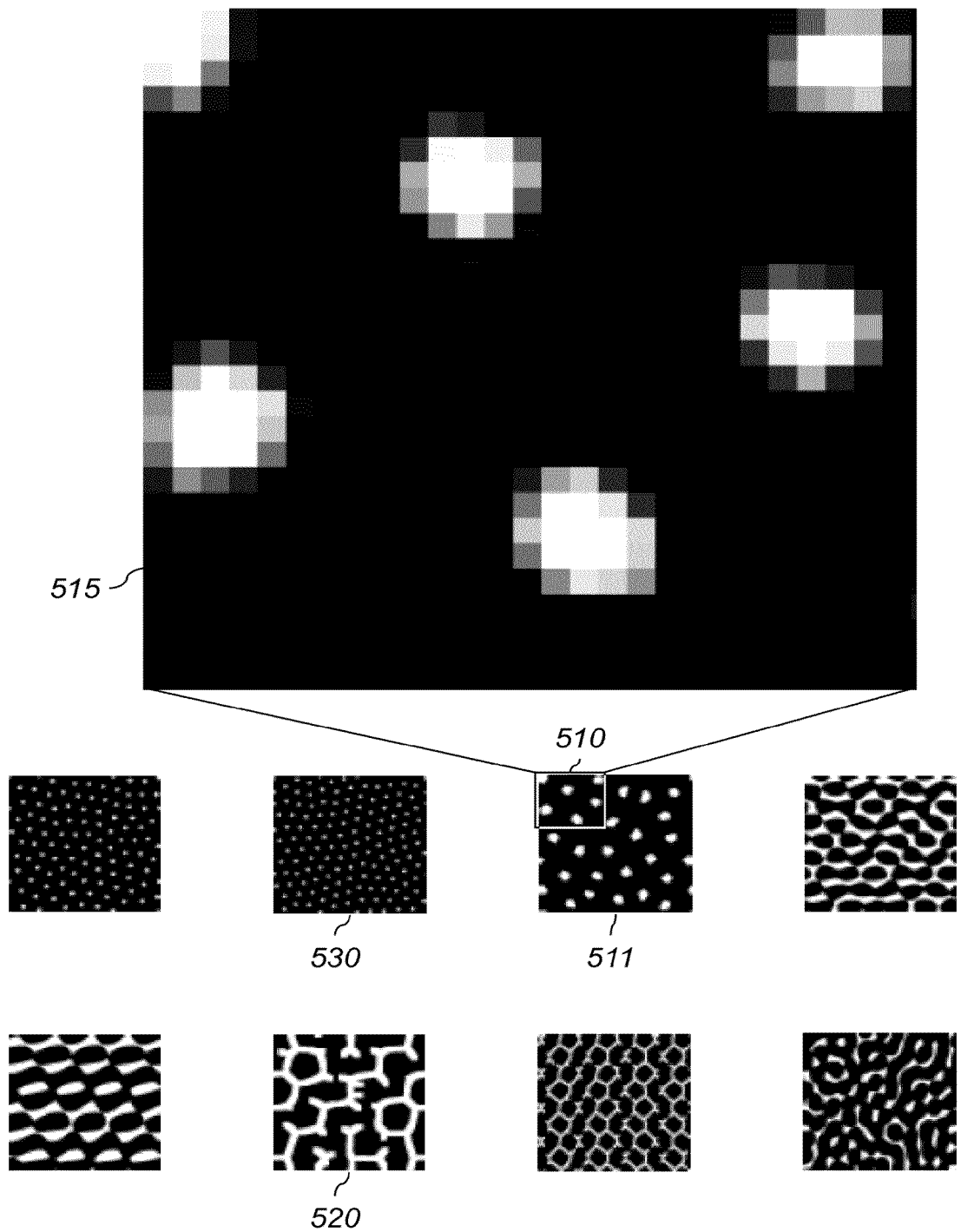
FIG. 5 shows examples of textures.

FIG. 5 shows examples of textures, including textures 520, 530. Toner is deposited in the white areas. Portion 510 of texture 511 is shown magnified 12× to demonstrate that the textures include multi-level data. The various shades of gray in magnification 515 correspond to different levels of toner laydown to form texture 511. In this example, white areas in magnification 515 correspond to areas of a selected maximum deposition of dimensional clear toner (referred to as $D_{max,t}$ where "t" represents "texture"). Black areas in magnification 515 correspond to areas in which clear toner is not intentionally deposited (although some may be deposited there because the EP process is stochastic). Areas in magnification 515 of various shades of gray correspond to areas in which some clear toner, but less than $D_{max,t}$ is deposited. In various embodiments, substantially circular white areas ($D_{max,t}$ areas) in the texture (such as those shown in magnification 515) have diameters ≤3 pixels, e.g., ≤0.005" at 600 dpi. Elongated $D_{max,t}$ areas (e.g., those in texture 520) are ≤3 pixels, e.g., ≤0.005", across. These dimensions produce perceptible texture without causing objectionable visible artifacts by altering the color of the image under the $D_{max,t}$ areas.

In various embodiments, the texture-forming material includes clear toner particles of at least 20 μm in diameter. These are examples of DMCL, as described above. In various embodiments, the texture-forming material includes metal particles and wax particles. For example, the texture-forming material can be a toner including clear, waxy toner particles (e.g., small clear, 8 μm or 6 μm diameter, or DMCL) and gold or silver flakes. When fused, the gold and silver flakes will be embedded in the matrix of melted wax and will provide a metallic appearance.

In various embodiments, at least one of the textures (e.g., 520, 530) in the texture set includes a microprinted pattern, a watermark, an image, an outline, a time or date stamp, a print-engine identification pattern, a print-shop identification pattern, an operator-identification pattern, or any combination thereof. These patterns can be loaded into texture memory 425 (FIG. 4) using cryptographic controls, as described above. These textures provide document security by marking a print with a texture, which photocopiers and other visible image reproducers will not reproduce. This permits easier detection of copies or forgeries. These patterns can also provide non-repudiation. A print with a given texture can only have been printed on a printer loaded with that texture. The CAs and those with signed keys control which textures are loaded, so a given texture can be traced to the parties that directed it to be produced.

In various embodiments, at least two textures are deposited on the receiver: a print-engine identification (ID) texture pattern unique to the print engine 270 (FIG. 4) that produced the print, and a watermark texture pattern. In this way, the watermark attests to the authenticity of the print (authentication), and the ID pattern prevents the particular printer who made the print from denying he did so (non-repudiation).

In various embodiments, at least a selected one of the textures in the texture set includes content having a spatial frequency above a selected cutoff frequency of the lossy compressor. As a result, if the selected texture were provided as part of the multilevel input tint data from data source 410 (FIG. 4), the selected texture would be modified or corrupted by the compression and decompression processes of compressor 415 and decompressor 420 (both FIG. 4). This is discussed further below. Storing the texture in texture memory 425 (FIG. 4) therefore advantageously permits the texture to be reproduced with high fidelity, since no compression or decompression is performed on the selected texture.

Spatial frequency and cutoff frequency can be expressed in terms of cycles per unit length (e.g., 300 cycles per inch is the highest spatial frequency a 600 dpi printer can produce), or in terms of lines per unit length. Lines per unit length, e.g., lines per inch (lpi), is a conventional measurement of the highest spatial frequency of a halftone screen and is particularly useful for non-sinusoids. The frequency of a screen, in lpi, is the highest number of features (e.g., halftone dots) of that screen per inch in any direction. In various embodiments, at least one of the textures in the texture set includes content having a line frequency above a selected cutoff line frequency of the lossy compressor.

In one example, the lossy compressor is a JPEG compressor, which compresses one 8×8-pixel block at a time. As a result, any features within one block are subjected to the JPEG discrete cosine transform (DCT) and are very likely to be modified. In a boundary case, a checkerboard of alternating single black and white pixels can only be represented accurately by the 64th (highest) term of the JPEG DCT. JPEG achieves its lossy compression in part by discarding higher-order DCT terms with amplitudes that are not visually significant. As a result, lossy JPEG compression will very rarely accurately reproduce a single-pixel checkerboard. In contrast, various embodiments described herein can correctly reproduce a single-pixel checkerboard. Other patterns are affected to a greater extent as they have higher-frequency spatial content. Decompression of DCTs encoded in a corresponding way is described in pgs. 62-69 of the MPEG-2 video compression standard, ISO/IEC 13818-2:2000(E), the disclosure of which is incorporated herein by reference. That the single-pixel checkerboard is the highest-order DCT coefficient is illustrated in FIG. 7-2 of this standard.

In a 600 dpi printer, an 8×8-pixel block is 13⅓ mils on a side. Features having a small dimension of less than that are subject to corruption in JPEG compression. Viewed differently, any feature finer than 600/8=75 lpi (lines per inch) will be corrupted. Textures in texture memory 425 (FIG. 4) can have features from 90-130 lpi. The lpi of a texture is the dpi of the printer divided by the closest spacing between features of the texture. For example, texture 530 has areas of toner (white dots) separated by approximately six pixels horizontally or vertically. The equivalent lpi for this texture is therefore approximately 600 dpi/6 pixels=100 lpi. This is finer than 75 lpi, so the dots and their spacings are subject to corruption in a lossy JPEG compression process. JPEG compression has a low-pass filtering effect, so the densities of the texture points can be reduced, and the points themselves broadened.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

| | |
|---|---|
| 21 | charger |
| 21a | voltage source |
| 22 | exposure subsystem |
| 23 | toning station |
| 23a | voltage source |
| 25 | photoreceptor |
| 25a | voltage source |
| 31, 32, 33, 34, 35, 36 | printing module |
| 38 | print image |
| 39 | fused image |
| 40 | supply unit |
| 42, 42A, 42B | receiver |
| 50 | transfer subsystem |
| 60 | fuser |
| 62 | fusing roller |
| 64 | pressure roller |
| 66 | fusing nip |
| 68 | release fluid application substation |
| 69 | output tray |
| 70 | finisher |
| 81 | transport web |
| 86 | cleaning station |
| 99 | logic and control unit (LCU) |
| 100 | printer |
| 200 | input pixel levels |
| 205 | workflow inputs |
| 210 | image-processing path |
| 220 | output pixel levels |
| 250 | screening unit |
| 260 | screened pixel levels |
| 270 | print engine |
| 310 | data-processing system |
| 320 | peripheral system |
| 330 | user-interface system |
| 340 | data-storage system |
| 404 | RIP |
| 418 | data link |
| 410 | data source |
| 415 | compressor |
| 420 | decompressor |
| 425 | texture memory |
| 430 | loader |
| 440 | expander |
| 450 | mux |
| 510 | portion of texture |
| 511 | texture |
| 515 | magnification of portion |
| 520, 530 | texture |

The invention claimed is:

1. Apparatus for depositing a texture on a receiver, comprising:
   a) a data source that provides multilevel input tint data values for a plurality of pixel sites;
   b) a lossy compressor that produces compressed multilevel tint data values from the multilevel input tint data values;
   c) a decompressor that produces multilevel decompressed tint data values from the compressed multilevel tint data values;
   d) a texture memory adapted to receive multilevel decompressed tint data values from the decompressor and provide corresponding multilevel texture pixel data values;
   e) a loader for loading into the texture memory a texture set including multilevel texture pixel data values for each of a plurality of textures, each texture in the texture set corresponding to a respective range of multilevel decompressed tint data values; and
   f) a print engine that deposits at each of a plurality of pixel sites on the receiver an amount of texture-forming material corresponding to multilevel texture pixel data values provided from the texture memory for the texture corresponding to the respective multilevel decompressed tint data values for the pixel sites.

2. The apparatus according to claim 1, further comprising:
   g) an expander for providing multilevel texture pixel data values in a selected wide range from multilevel decompressed tint data values in a selected narrow range; and
   h) a multiplexer for receiving the multilevel decompressed tint data values from the decompressor and, if one of the received values is in the narrow range, providing the corresponding multilevel texture pixel data value from the expander to the print engine, and otherwise, providing the corresponding multilevel texture pixel data value from the texture memory to the print engine.

3. The apparatus according to claim 1, wherein the loader receives an authentication key, checks the authentication key for validity, and loads the texture set into the texture memory if and only if the authentication key is valid.

4. The apparatus according to claim 1, wherein at least one of the textures in the texture set includes a microprinted pattern, a watermark, an image, an outline, a time or date stamp, a print-engine identification pattern, a print-shop identification pattern, or an operator-identification pattern.

5. The apparatus according to claim 1, wherein at least one of the textures in the texture set includes content having a spatial frequency above a selected cutoff frequency of the lossy compressor.

6. The apparatus according to claim 5, wherein the selected cutoff frequency is 75 lpi.

7. The apparatus according to claim 1, wherein a print-engine identification texture unique to the print engine and a watermark texture are deposited on the print.

8. The apparatus according to claim 1, wherein the texture-forming material includes clear toner particles of at least 20 μm in diameter.

9. The apparatus according to claim 1, wherein the texture-forming material includes metal particles and wax particles.

* * * * *